United States Patent [19]

Kemmer

[11] Patent Number: 4,623,032
[45] Date of Patent: Nov. 18, 1986

[54] METHOD OF DETECTING THE PRESENCE OF OBSTACLES IN THE OPERATION OF REMOTE-CONTROLLED MACHINES

[75] Inventor: Claes Kemmer, Motala, Sweden

[73] Assignee: Aktiebolaget Bygg-och Transportekonomi, Mjolby, Sweden

[21] Appl. No.: 718,078

[22] Filed: Apr. 1, 1985

[30] Foreign Application Priority Data

Apr. 6, 1984 [SE] Sweden .............................. 8401939

[51] Int. Cl.$^4$ .............................................. B60K 27/00
[52] U.S. Cl. .................................... 180/169; 307/525; 340/904; 367/909
[58] Field of Search ................ 180/167, 169; 307/529, 307/525; 340/658, 904; 367/909

[56] References Cited

U.S. PATENT DOCUMENTS

| 4,026,654 | 5/1977 | Beaurain | 180/169 |
| 4,095,666 | 6/1978 | Baba | 180/169 |
| 4,280,580 | 7/1981 | Wojcik | 180/169 |
| 4,528,563 | 7/1985 | Takeuchi | 180/169 |

Primary Examiner—John J. Love
Assistant Examiner—Michael Mar
Attorney, Agent, or Firm—Frishauf, Holtz, Goodman & Woodward

[57] ABSTRACT

A method for detecting obstacles, such as people for example, in the operation of remote-controlled vehicles (10). The vehicle may be an industrial materials-handling truck or an industrial robot equipped with a data processing control system and transmitters (20,22) and receivers (24) for ultra-sound waves. Ultra-sound pulses are transmitted continuously in groups from the transmitter in a pre-determined pattern, and only one input signal having a pulse pattern corresponding to the aforementioned predetermined pattern for respective pulse groups is received by the receiver (24) and evaluated by the data processor for controlling maneuvering of the vehicle (10).

6 Claims, 5 Drawing Figures

METHOD OF DETECTING THE PRESENCE OF OBSTACLES IN THE OPERATION OF REMOTE-CONTROLLED MACHINES

The present invention relates to a method of detecting the presence of obstacles, for example people, in the operation of remote-controlled machines, such as industrial handling vehicles or industrial robots provided with a transmitter and receiver for ultra-sound waves.

A conventional vehicle with which the invention can be applied, for example a materials-handling vehicle, may comprise a so-called autotruck intended for the conveyance of goods. This vehicle is equipped with an electronic control system which is based on a microprocessor and which guarantees the accuracy in which goods are handled, high efficiency, good economical resources, and flexibility. The data processing control system accepts signals from control antennae, radar equipment, pulse emitters or transducers etc. The signals are interpreted and evaluated by the data processor and transmitted in the form of instructions to the control motor, drive motor, etc of the autotruck.

The truck is equipped with a protective bumper means which protects people against injury. It has now been found suitable to use ultra-sound as a replacement or supplement to this obstacle detecting equipment. The main problem with this latter type of equipment arises from disturbances caused by leaking pressurized-air hoses, diverse impacts, bangs and rattles and the like. Such disturbances often lie within the frequency range of the ultra-sound equipment and can therefore cause the machine to stop unnecessarily. It will also be understood that different machines which have a mutual influence one upon the other can give rise to unwarranted stoppages and disturbances.

The main object of the invention is to provide a method with which the aforesaid disadvantages are overcome.

In accordance with the invention this object is achieved with a method of the kind mentioned in the introduction which is characterized in that ultra-sound pulses are transmitted from the transmitter in groups in a predetermined pattern in the form of continuous signals; and in that only one input signal having a pulse pattern corresponding to said pre-determined pattern for respective pulse groups is received by the receiver and evaluated by the data processor, to control the maneuvering of the machine. When applying this method all risk is eliminated of the machine reacting to pulse groups from other machines and to the echoes from far distant walls, or to disturbances of other kinds, for example sudden sonic impacts. The risk of disturbances of a wide frequency range, so-called white noise caused by air leaking from pressurized-air hoses for example, is also overcome by processing the incoming reflected signals—the echo signals—in a particular manner in the data processor of the machine.

An embodiment of the invention will now be described in more detail with reference to the accompanying drawings.

Figure 1:
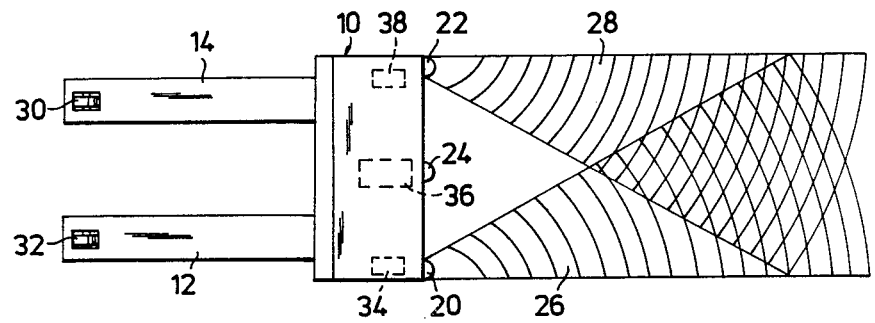
FIGS. 1 and 2 are a plan view and a side view respectively of an industrial materials-handling vehicle with which the method according to the invention can be applied.
Figure 2:
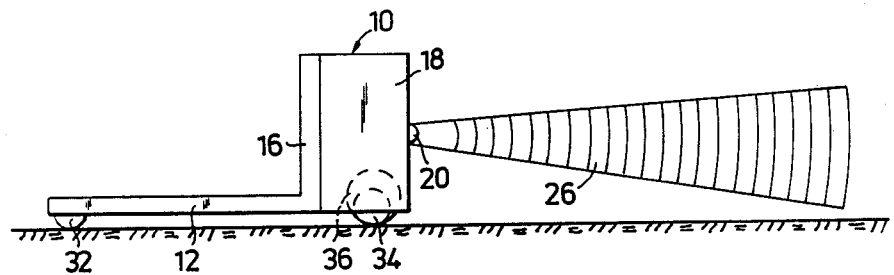

Only the main parts of an industrial materials-handling vehicle, such as a fork-lift truck 10, are illustrated in FIGS. 1 and 2. The illustrated truck 10 thus comprises a lifting-tine assembly 16 having two lifting tines 12 and 14. The assembly 16 is adjustably connected to a controlling and operating unit 18 which accommodates the data processing control system (not shown). Arranged on the unit 18 are two transmitters 20, 22 and a receiver 24. The transmitters 20, 22 are placed so that their scanning areas 26, 28 partially overlap one another. The FIGS. 1 and 2 also show five truck wheels 30, 32, 34, 36, 38, of which one, the drive wheel 36, is larger than the others and is centrally arranged.

Figure 3:
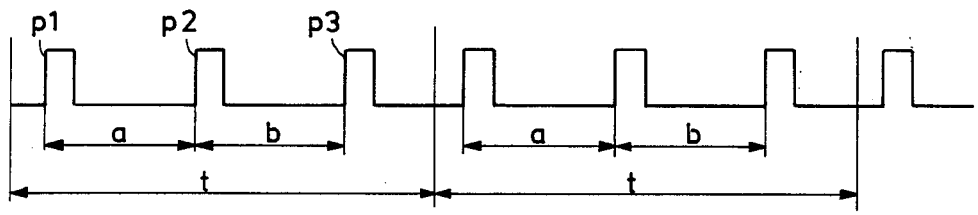
FIGS. 3 and 4 are diagrams illustrating two different groups of pulses, each group being intended to identify a respective machine.
Figure 4:
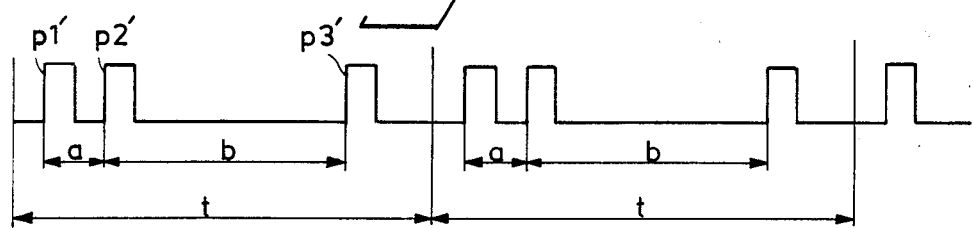

In the arrangement illustrated in FIGS. 3 and 4 each of the pulse groups comprises three pulses p1, p2, p3 and p1', p2', p3', respectively, although it will be understood that the number of pulses can be varied as desired. The total time for each pulse group transmitted from the truck 10 is referenced $t$ and the distance between the pulses in corresponding groups is referenced $a$ and $b$ respectively. Consequently, each truck 10 is allotted a particular pulse group of given pattern which identifies the truck or vehicle in question, said pulse group being transmitted continuously. The data processor (not shown) of the truck 10 is programmed in a known manner so that the speed at which the truck moves becomes slower with shortening distances to an obstacle located in the path of the truck. The truck 10 is programmed to stop fully when located at a given distance from the obstacle and is restarted when the obstacle is removed. If the reception or the internal transfer of the pulse groups in the truck should cease or be brought out of function, a safety circuit causes the brakes of the truck to be applied. The same event takes place when an obstacle moves towards the truck or vehicle at a speed which is greater than that travelled by the truck 10. Echoes emanating from distant walls etc can be ignored, since the reflected pulses then fall in a subsequent pulse group.

Figure 5:
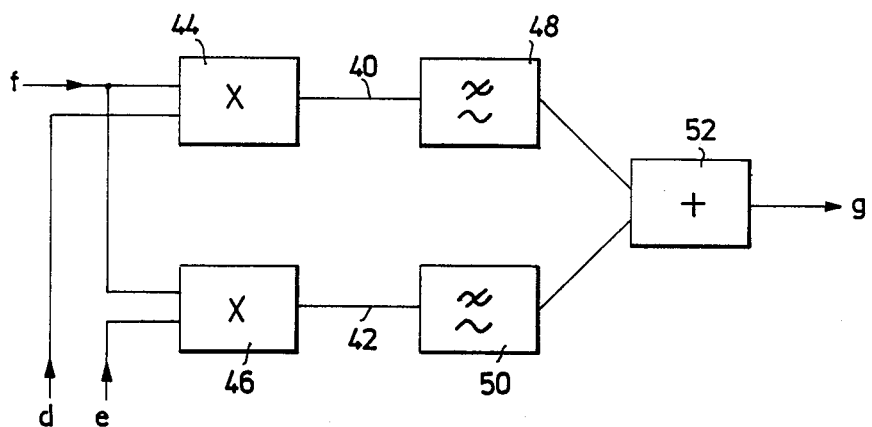
FIG. 5 is a block schematic illustrating an exemplary embodiment of apparatus utilized when carrying out the method according to the invention.

As illustrated in FIG. 5, the input signal is mixed with the output signal in each of two signal processing channels 40, 42. The phase of the output signal in the one channel 42 is displaced by about 90°. The input and output signals are mixed in two multipliers 44, 46. The two phase-dependent signals are filtered with respect to the transmitted pulse length in respective low-pass filters 48, 50 and are passed to an adder 52, in which they are rectified and combined.

In this respect:

$f$ is the input signal $= U^{in} = A \sin \omega t$ $d$ and $e$ are reference signals with the same frequency as in the transmitted pulse with the phase position $\omega_c t$ and $\omega_c t + 90°$ respectively; and $g$ is the resultant signal $U_{res}$ When $\omega_c = \omega$ this latter signal is solely proportional to A and independent of $\omega$ according to the following analysis, in which the reference signal has been allotted the value B sine $(\omega t + \phi)$, where $\phi$ is the phase difference between the reference signal and the incoming signal, wherewith the value of $\phi$ becomes dependent on the distance from the echo source.

The output signal from the multiplier 44 (channel 40) becomes $$\tfrac{1}{2}AB[\cos(\omega_c t - \omega t + \phi) + \cos(2\omega t + \phi)]$$

When $\omega_c \omega$ there is obtained $$\tfrac{1}{2}AB[\cos \phi + \cos(2\omega t + \phi)]$$

and subsequent to being processed in the low-pass filter 48 with respect to the transmitted pulse length $\tfrac{1}{2}AB \cos \phi$. When the signal in channel 42, which incorporates the multiplier 46 and the low-pass filter 50, is displaced in phase by 90° in relation to the signal in channel 40, there is obtained $\tfrac{1}{2}AB \sin \phi$. These two signals are squared and added together and the root is drawn from the result, which gives $\tfrac{1}{2}AB\sqrt{\sin^2 \phi + \cos^2 \phi}$, i e $\tfrac{1}{2}AB$, where the square-root term in pure definition is equal to one. The end result is thus consequently, the amplitude of the incoming signal can be compared with a given threshold value and if this value is exceeded information is transmitted to the data processors that a signal has been received which has the same frequency and at least the same pulse length as the output pulse group signals.

It is possible in practice to obtain a satisfactory result with a system of simpler and less expensive construction. When the signals from the low-pass filters are only half-wave rectified and added together there is obtained: $g = \tfrac{1}{2}AB(|\cos \phi| + |\sin \phi|) \sim KA$, wherein the sum of the terms within parentheses only varies between 1 and 1.4, irrespective of the value of $\phi$.

The amplification factor is made time dependent, i.e. it increases with time from the instance of transmitting a pulse, so that a weaker signal, an echo from a far distance, is amplified to a greater extent than an echo from a shorter distance.

The amplification factor is also made logarithmic, so as to be able to manage the dynamics of the signal, i.e. a stronger signal is amplified to a proportionally lesser extent than a weaker signal.

I claim:
1. A method of detecting obstacles in the path of an operating remote-controlled machine having a data processing control system, transmitters, and receivers for ultra-sound waves, comprising the steps of:
   transmitting ultra-sound pulses in groups continously from said transmitters in a predetermined pattern thereby forming pulse group output signals;
   receiving only an input signal having a pulse pattern corresponding to the predetermined pattern of said pulse group output signals by the receiver; and
   evaluating the received input signal by using the data processing control system for controlling the maneuvering of the vehicle, including mixing the received input signal with a reference signal of the same frequency as the output signals in each of two channels and displacing the phase of the reference signal in one channel by about 90° relative to the reference signal in the other channel.

2. A method according to claim 1, including filtering the mixed signals in respective channels and then adding them together, so that the resultant signal is proportional to the amplitude of the input signal.

3. A method according to claim 2, wherein subsequent to being filtered the mixed signals are squared and added together, and thereafter taking the square root of the resultant signal.

4. A method according to claim 2, wherein the mixed signals subsequent to being filtered are half-wave rectified and added together.

5. A method according to claim 1, including amplifying the received input signal proportionally to the distance between a receiver and an echo source.

6. A method according to claim 1, including amplifying the received signal inversely proportional to its amplitude.

* * * * *